United States Patent [19]
Brubaker et al.

[11] 3,852,561
[45] Dec. 3, 1974

[54] CONSTANT SPEED CONTROL FOR AN AUTOMATIC WELDER

[76] Inventors: Dale R. Brubaker, 2906 Onrado, Torrance, Calif. 90503; Daniel S. Weinstein, 3320 Starline Dr., Palos Verdes, Calif. 90274

[22] Filed: Apr. 30, 1973

[21] Appl. No.: 355,626

Related U.S. Application Data

[63] Continuation-in-part of Ser. No. 244,376, April 17, 1972, abandoned.

[52] U.S. Cl. .................. 219/125 R, 219/125 PL
[51] Int. Cl. ................................................ B23k 9/12
[58] Field of Search ........ 219/124, 107, 125 R, 122, 219/125 PL; 338/89; 318/576–578

[56] References Cited
UNITED STATES PATENTS 3,017,496  1/1962  Greene ............................ 219/124
3,496,437  2/1970  Layden ............................ 318/577

*Primary Examiner*—C. L. Albritton
*Attorney, Agent, or Firm*—Charles T. Silberberg; L. Lee Humphries

[57] ABSTRACT

A constant speed control is described in combination with an automatic welder wherein the torch is capable of being driven simultaneously by two separate motor drives along two orthogonal axes. A novel device is combined therewith that gives the instantaneous bearing direction of an undulating torch path with respect to the longitudinal axis of a workpiece and controls the speed along that axis in a manner to keep the torch's tracking speed along the undulating torch path constant.

12 Claims, 5 Drawing Figures

CONSTANT SPEED CONTROL FOR AN AUTOMATIC WELDER

CROSS-REFERENCE TO RELATED APPLICATION

This application is a continuation-in-part of application Ser. No. 244,376; Filed Apr. 17, 1972; now abandoned For CONSTANT SPEED CONTROL FOR AN AUTOMATIC WELDER; Applicants: Dale R. Brubaker and Daniel S. Weinstein.

FIELD OF THE INVENTION

This invention relates to devices for controlling the tracking speed of, for example, a welding torch or other tool that is capable of being moved along curved paths.

BACKGROUND OF THE INVENTION

In patent application Ser. No. 185,995, filed on Oct. 4, 1971, now abandoned, U.S. Pat. application Ser. No. 368,543, filed on June 8, 1973, and U.S. Pat. application Ser. No. 390,985, filed Aug. 23, 1973, all assigned to the same assignee as this invention, there is described a system for joining two metal sheets in "T" relationship wherein two infrared sensors, disposed on opposite sides of the vertical member, detect any welding puddle heat imbalances from the underside and produce an unbalance signal. This signal is used to move the welding heat source or torch transversely across the puddle in a direction to nullify the signal, thereby restoring the heat balance between both sides of the vertical member. This is done as the torch moves progressively along the weldment. Although that application teaches a process that is an advance over the prior art, the process does have its limitations. For example, if one desires to weld a substantially straight vertical member to a cross member, very good results are achieved. However, one finds that, if the vertical member has a sinusoidal configuration, the resultant weld degrades progressively as the amplitude of the configuration, increases with constant space-frequency, i.e., equi-distances between the crossings that the sine wave makes with the longitudinal axis of the workpiece. Conversely, one also observes that the weld seam degrades as the space-frequency increases (smaller distances between crossings) with constant space amplitude. The reason for the degradation is that, as the angle between the general welding direction and the actual direction of the travel of the torch increases, the actual tracking speed of the torch along the weld increases, and, conversely, as this angle decreases, the weld tracking speed decreases. Good welds are inherently produced at optimum welding tracking speeds.

OBJECTS OF THE INVENTION

An object of this invention is to provide a means that causes a tool to move at a substantialy constant speed along a curved path when the tool is being driven by two power means along crossing axes.

Another object of this invention is to maintain constant tracking speed for a torch along an undulating weld seam.

Another object of this invention is to determine the angle at which the path of a tool is travelling with respect to a fixed longitudinal axis and controlling the velocity vector of the tool along the axis to produce a constant tracking speed.

Another object of this invention is to provide a suitable caster that rolls along the surface of a workpiece as the tool moves therealong and the degree of angular rotation of the caster indicates the angle of the tool's path with respect to a fixed longitudinal axis of the workpiece.

These, and other objects and features of advantage, will become more apparent after studying the following description of the preferred embodiment together with the appended drawings.

DETAILED DESCRIPTION OF THE DRAWINGS

Although this invention would be useful in other applications besides in the welding art, such as cutting and grinding tools, the invention, for clarity, will be described in combination with a welding apparatus.

Figure 1:
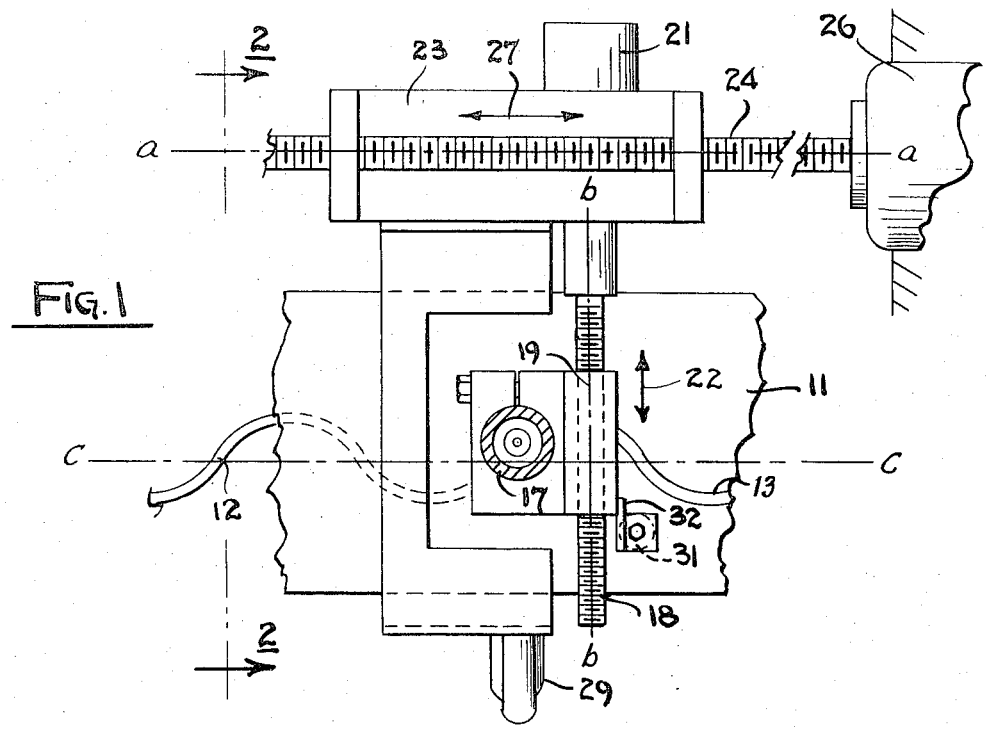
FIG. 1 is a schematic plan view of the welding apparatus incorporating the improved novel feature.
Figure 2:
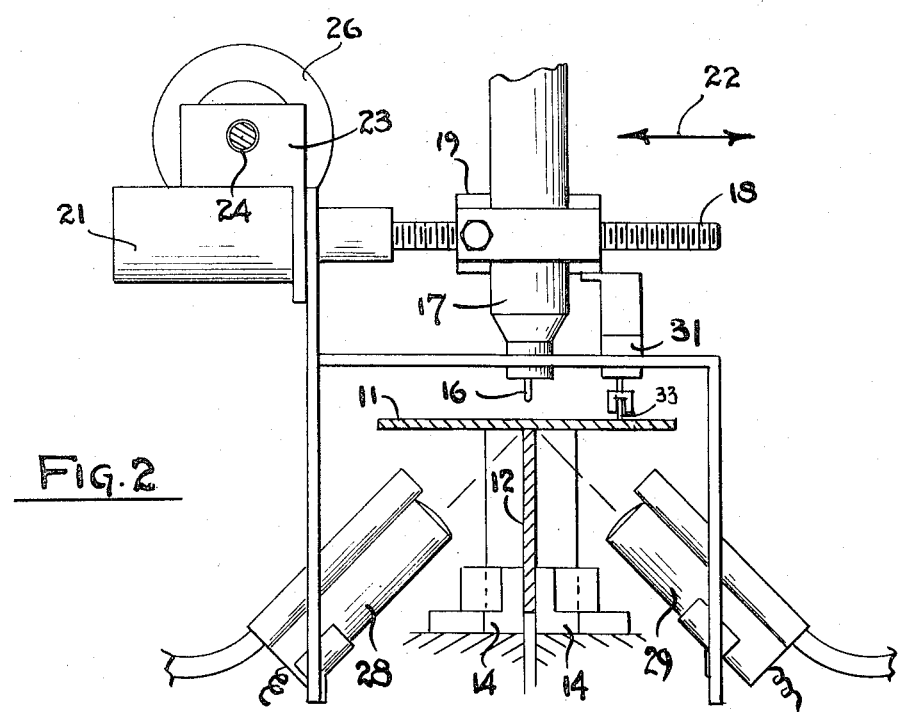
FIG. 2 is a schematic elevation of the apparatus taken along line 2—2 of FIG. 1 in the direction of the arrows.

Referring to FIGS. 1 and 2, there is shown a schematic plan and elevation, respectively, of a welding apparatus that includes our novel means that produces a constant speed for the torch for more accurately welding a relatively thin metallic sheet 11 to a thin metallic web 12 to form a T section. As it is well kown in the art, a stronger welded structural member is obtained if web 12 has a shape in the form of a sinusoidal wave. In FIG. 1, the weld seam or fillet is suggested by item 13. Sheet 11 and web 12 are held in place by block means 14. The welding is performed by an arc formed between a non-consumable electrode 16 and sheet 11. The electrode is enclosed by a suitable welding cup or torch 17 for surrounding the arc with an inert gas. The torch 17 is suitably mounted on a lead screw 18 by nut means 19 so that, as the motor 21 rotates, the welding torch is moved in the direction as indicated by double headed arrow 22. Motor 21 is mounted on a support frame 23 which, in turn, engages another lead screw 24 so that, as another motor 26 rotates, frame 23 is moved in the direction as indicated by the double headed arrow 27 (FIG. 1). One will note that the direction of travel of support frame 23 is along the axis $a$—$a$ of the lead screw 24 while the nut support 19 reciprocates along the axis $b$—$b$ of lead screw 18, said axis $b$—$b$ being disposed normal to axis $a$—$a$ forming an orthogonal relation to each other. Obviously, if the relative speed and direction of motors 21 and 26 are controlled, the electrode 16 can be made to follow any path within a plane.

Motor 21 receives an electrical signal as required to translate torch 17 in a direction transverse to the weld seam 13. The amount and direction of the electrical signal applied to motor 21 determines the amount and direction of rotation of lead screw 18 and the consequent amount and direction of movement of bracket 19 and torch 17. The signal thus applied to motor 21 is initiated through suitable electrical controls and circuitry, but is initiated by the cooperative operation of two or more heat sensors such as infrared sensors 28 and 29. The sensors are directed toward weld fillet 13 and are separated by component 12 which forms a barrier therebetween. When thus arranged, sensor 28 provides an electrical signal which varies according to the amount of heat radiated by weld fillet 13, while sensor 29 provides a similar signal which will vary in response to the amount of heat also radiated by the weld fillet exposed on the opposite side of component 12. When equal radiation is sensed by both elements 28 and 29, the electrical signals originating from both sensors will be substantially equal and motor 21 will remain stationary. Thus, the output of heat sensors 28 and 29 controls the direction of travel of torch 17 in the direction as indicated by double headed arrow 22 along the axis b—b of lead screw 18.

Figure 3:
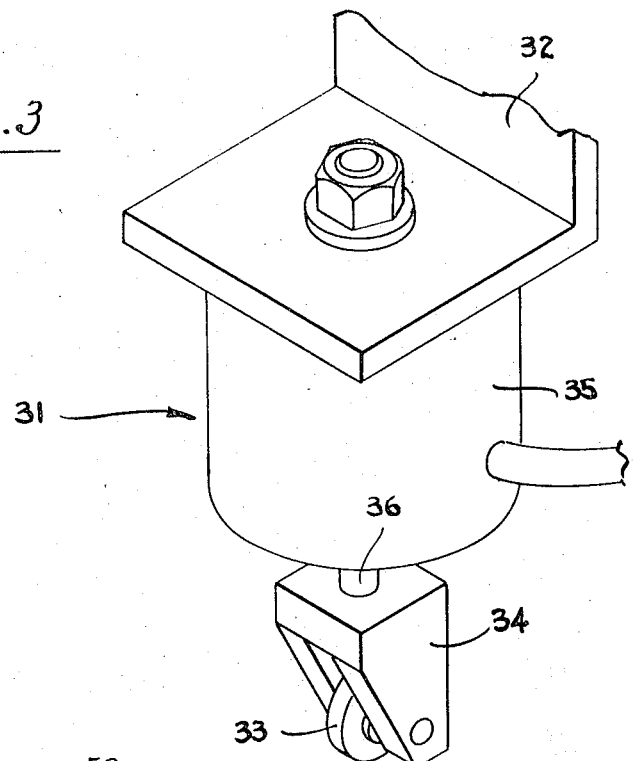
FIG. 3 is an enlarged view of the tracking caster used to indicate the angle between the instantaneous torch path and a fixed axis.
Figure 4:
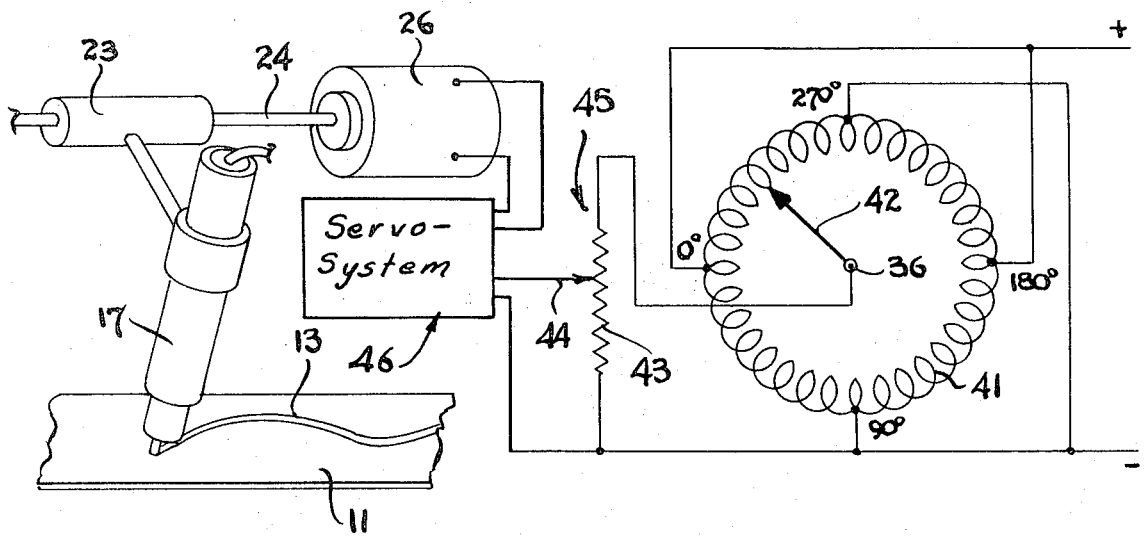
FIG. 4 is a schematic circuit diagram used in this system.

Since the object of this invention is to maintain a constant welding speed along the total weld length, there is incorporated an angle measuring means 31 that measures the instantaneous angle of the weld path with respect to axis c—c of the workpiece parallel to arrow 27. Referring to FIG. 3, one embodiment of the angle measuring means 31 is shown. The means 31 is suitably mounted onto the nut means 19 by bracket 32 to move therewith so that a roller 33 rolls on sheet 11 as shown in FIG. 2. The roller 3 is mounted on a spindle 34 that is rotatably mounted to a housing 35 by a shaft 36. The roller 33 and spindle 34 react as a common caster so that the spindle 34 rotates freely to allow the roller 33 to roll in the direction of travel of the welding torch 17. Therefore, the angle that the roller 33 makes with respect to axis a—a is the same as the angle that the path of the electrode 16 makes with the same axis which will hereinafter be described in greater detail. Housing 35 encloses a circular potentiometer schematically shown in FIG. 4. The potentiometer is commonly referred to as a cosine potentiometer and has a resistor coil 41, formed into an endless circle, with a wiper 42, mounted to rotate with shaft 36. The coil 41 is made with four terminals disposed 90° apart. The terminals marked 0° and 180° are connected to a positive bus bar while the terminals marked 90° and 270° are connected to a negative bus bar. The wiper 42 is connected to one end of a resistor 43 that has its other side connected to the negative bus bar. Another wiper 44 is used to pick off a voltage from resistor 43 to power the motor 26. Wiper 44 and resistor 43 form a potentiometer 45 to control the overall speed of the motor 26 so that, as the wiper 44 is manually operated, the speed can be increased or decreased. Superimposed on the voltage at wiper 44 is the voltage picked off by wiper 42. One sees that, when wiper 42 is at the zero terminal, torch 17 is travelling at the maximum speed for the respective setting on potentiometer 45. As the wiper 42 moves away from the zero degree terminal, the voltage pointer 42 decreases, slowing up the overall speed of the motor 26 to maintain the speed of the electrode over the sheet 11 substantially constant. The half of the potentiometer between the terminals 90°, 180°, and 270° is used when the torch is welding in the opposite direction. To include a more efficient operating device there is also provided a servo system, generally indicated at 46, that is interconnected between potentiometer 45 and motor 26. This servo system 46 utilizes the command signal appearing on wiper 44 of the angle measuring means to generate an amplified signal whereby the motor is driven at the precise required speed.

Figure 5:
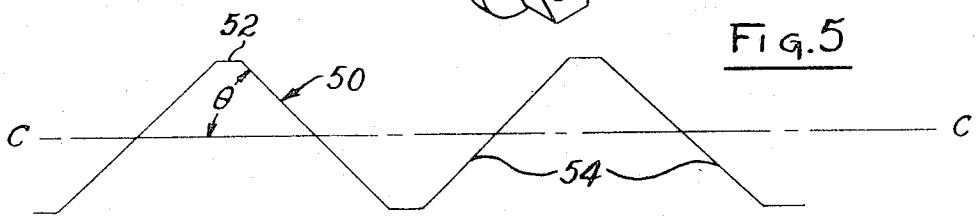
FIG. 5 is a schematic diagram of the weld path with respect to the axis of the workpiece.

To aid in the clarification of the basic operation of said invention, attention should be directed to FIG. 5, in which there is shown a schematic diagram of the weld path indicated at 50 having peaks 52 and angle lines 54. Thus, center line c—c represents the axis of the workpiece as seen in FIG. 1, to which the axis a—a of the lead screw 24 is positioned parallel thereto. Accordingly then, forward or rearward movement of the welding tool is imparted by motor 26 which is set at a maximum speed by potentiometer 45. Hence, as the torch 17 travels in a direction of arrow 27, said torch is simultaneously undulated along lines 54 and the path thereof is controlled by heat sensors 28 and 29. Here it should be emphasized that the sensors only control the direction of travel of the torch with respect to axis c—c and not the speed of travel thereof.

The roller 33 thus follows in a parallel path with that of the torch, causing the cosine potentiometer to adjust to whatever instantaneous angle the torch might take, such as indicated by $\theta$ in FIG. 5. It then can be seen that $\theta$, can range in any degree between zero and 90° with respect to either side of axis c—c of the workpiece and that as the roller 33 follows a particular angle the potentiometer thus regulates the speed of motor 26 such that when the roller 33 reaches the peak of the wave, said peak indicated at 52, the movement of the tool in the direction of arrow 27 is at its maximum speed and as the roller is positioned along the general angle line 54, the motor speed decreases; thus, the speed in the direction of arrow 27 decreases. It should be understood that as the $\theta$ increases with respect to axis c—c the speed of motor 26 decreases and conversely as $\theta$ decreases the speed of motor 26 increases. The instantaneous angle can vary according to the design of the member 12.

Accordingly, the speed along axis a—a of the torch 17 will fluctuate as a function of the shape of path 13.

Although the preferred embodiment of the invention is shown, one skilled in the art, after studying the teachings of this invention, can devise other embodiments to perform the same function. For example, one can use Ac current to operate motor 26 instead of DC current and the potentiometers would be substituted by transformer type voltage controllers normally referred to as "Variacs." Therefore, the invention is not limited to the disclosed embodiment but includes all embodiments falling within the appended claims.

What is claimed is:

1. A constant speed control for a tool to be moved along a predetermined curved path in a plane of a workpiece, said control comprising:

first means for moving said tool along a longitudinal axis parallel to the longitudinal axis of said workpiece;

second means for simultaneously moving said tool along a transverse axis with respect to said longitudinal axis of said workpiece; and speed control means for maintaining a constant speed of said tool along said curved path, said speed control means coupled for travel with said tool.

2. Apparatus as set out in claim 1, wherein said first means is responsive to said speed control means, whereby the travel speed of said first means will vary as said tool travels said curved path.

3. Apparatus as set out in claim 2 wherein said curved path is inside the periphery of said workpiece.

4. Apparatus as set out in claim 1, wherein said speed control means includes a means for detecting the angle of travel of said tool with respect to the longitudinal axis of said workpiece.

5. Apparatus as set out in claim 4, wherein said second means reciprocates transversely across said workpiece at a constant travel speed relative to the varying longitudinal speed of said first means.

6. Apparatus as set out in claim 5, wherein said tool includes a welding torch and wherein said curved path is defined by a welding contact between a first and second workpiece, the welding edge of said second workpiece having an undulating configuration.

7. Apparatus as set forth in claim 4, wherein said speed control means comprises a caster disposed to roll along a surface in said plane and to swivel on an axis normal to said surface, and a potentiometer having its wiper fixed to the swivel motion of said caster so that the voltage level of said wiper is an error signal and is dependent upon the angle of rotation of said swivel; and wherein said first means is responsive to said voltage level to cause the tool to change speed along the longitudinal axis of the workpiece.

8. An automatic welder having a welding tool to be moved along a predetermined curved path in a plane of a workpiece comprising:

first means for moving said tool along a longitudinal axis parallel to the longitudinal axis of said workpiece;

second means for simultaneously moving said tool along a transverse axis with respect to said longitudinal axis of said workpiece;

sensing means for detecting welding puddle imbalances, said second means being responsive to said sensing means; and speed control means for maintaining a constant speed of said tool along said curved path, said speed control means coupled for travel with said tool.

9. A constant speed control for a tool to be moved along a predetermined curved path in a plane of a workpiece, said control comprising:

first means for moving sid tool along a longitudinal axis parallel to the longitudinal axis of said workpiece;

second means for simultaneously moving said tool along a transverse axis with respect to said longitudinal axis of said workpiece; and a speed control means indirectly coupled to said tool to travel therewith, said speed control means including a means for detecting the angle of travel of said tool with respect to the longitudinal axis of said workpiece, said first means being responsive to said angle detecting means, whereby the travel speed of said first moving means will vary as said tool travels said curved path.

10. The control of claim 9, wherrein said second moving means reciprocates transversely across said workpiece at a constant travel speed relative to the varying longitudinal speed of said first moving means.

11. The control of claim 10 wherein said tool includes a welding torch and wherein said curved path is defined by a welding contact between a first and a second workpiece, the welding edge of said second workpiece having an undulating configuration.

12. The control of claim 10, wherein said speed control means comprises:

a caster disposed to roll along a surface in said plane and to swivel on an axis normal to said surface;

a potentiometer having its wiper fixed to the swivel motion of said caster so that the voltage level of said wiper is an error signal and is dependent upon the angle of rotation of said swivel;

said first means being responsive to said voltage level to cause the tool to change speed along the longitudinal axis of the workpiece.

* * * * *